United States Patent
Kundu et al.

(10) Patent No.: US 6,963,957 B1
(45) Date of Patent: Nov. 8, 2005

(54) MEMORY PAGING BASED ON MEMORY PRESSURE AND PROBABILITY OF USE OF PAGES

(75) Inventors: Joydip Kundu, Nashua, NH (US); Qinqin Wang, Nashua, NH (US); Benedicto Garin, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 195 days.

(21) Appl. No.: 10/337,309

(22) Filed: Jan. 7, 2003

(51) Int. Cl.$^7$ ............................................. G06F 12/12

(52) U.S. Cl. .................................................... 711/160

(58) Field of Search ................ 711/159–160, 133–136; 707/206

(56) References Cited

U.S. PATENT DOCUMENTS

| | | | | |
|---|---|---|---|---|
| 5,893,922 A | * | 4/1999 | Baylor et al. | 711/148 |
| 6,012,126 A | * | 1/2000 | Aggarwal et al. | 711/133 |

* cited by examiner

*Primary Examiner*—Matthew D. Anderson
(74) *Attorney, Agent, or Firm*—Swidler Berlin LLP

(57) ABSTRACT

The present invention is a paging scheme that provides improved performance for various applications. In one embodiment of the present invention, a method of paging data comprises the steps of storing a plurality of pages of data in a main memory, determining that paging must occur, and paging out a page of data from the main memory based on the memory pressure of the page of data. The paging out step may comprise the steps of determining an amount of time a page is or will be in memory for each of the plurality of pages of data in the main memory and determining a memory pressure for each of the plurality of pages of data in the main memory.

26 Claims, 4 Drawing Sheets

MEMORY PAGING BASED ON MEMORY PRESSURE AND PROBABILITY OF USE OF PAGES

FIELD OF THE INVENTION

The present invention relates to a memory paging scheme that provides improved performance in various applications.

BACKGROUND OF THE INVENTION

Virtual memory is essentially an imaginary memory area supported by some operating systems in conjunction with the hardware. The purpose of virtual memory is to enlarge the address space, the set of addresses a program can utilize. For example, virtual memory might contain twice as many addresses as main memory. A program using all of virtual memory, therefore, would not be able to fit in main memory all at once. Nevertheless, the computer could execute such a program by copying into main memory those portions of the program needed at any given point during execution.

Paging is a technique used by virtual memory operating systems to help ensure that needed data is available. The operating system copies a certain number of pages from a storage device to main memory. When a program needs a page that is not in main memory, the operating system copies the required page into memory and copies another page back to the disk. A page that is removed from main memory and copied back to the disk is termed paged out.

Paging schemes are often generic to support a variety of applications. A paging scheme decides which pages should be removed from memory (without affecting application correctness) so that the effect on system performance is minimized. A variety of algorithms have been used:

Least Recently Used (LRU)—the page that has been accessed least recently will be paged out.
Most Recently Used (MRU)—the page that has been accessed most recently will be paged out.
First-In, First-Out (FIFO)—the page that was brought into memory first is removed first.
Last-In, Last-Out (LIFO)—the page that was brought into memory last is removed first.

Paging schemes that are good for operating systems, such as LRU, may not be ideal, in terms of performance, for a particular application. A need arises for a paging scheme that provides improved performance for applications.

SUMMARY OF THE INVENTION

The present invention is a paging scheme that provides improved performance for various applications. In one embodiment of the present invention, a method of paging data comprises the steps of storing a plurality of pages of data in a main memory, determining that paging must occur, and paging out a page of data from the main memory based on the memory pressure of the page of data. The paging out step may comprise the steps of determining an amount of time a page is or will be in memory for each of the plurality of pages of data in the main memory and determining a memory pressure for each of the plurality of pages of data in the main memory. The step of determining a memory pressure for each of the plurality of pages of data in the main memory may comprise the steps of determining the memory pressure based on a product of the amount of time a page is or will be in memory without being used and a size of the page. The step of determining an amount of time a page is or will be in memory for each of the plurality of pages of data in the main memory may comprise the step of determining a probability of use of each of the plurality of pages of data in the main memory. The step of determining a probability of use of each of the plurality of pages of data in the main memory may comprise the steps of determining whether a page is associated with a transaction for which all data has been generated, if the page is associated with a transaction for which all data has been generated, assigning a higher probability of use, and if the page is associated with a transaction for which not all data has been generated, then determining whether any pages in a group of pages associated with a transaction have been used, if at least one of page in the group of pages associated with a transaction have been used, assigning a higher probability of use, and if at no page in the group of pages associated with a transaction have been used, assigning a lower probability of use. The step of assigning a lower probability of use if at no page in the group of pages associated with a transaction have been used may comprise the step of assigning a probability of use to a page based on how recently the page was stored in main memory. The step of assigning a probability of use to a page based on how recently the page was stored in main memory may comprise the steps of assigning a higher probability of use to a page that was stored in main memory relatively less recently and assigning a lower higher probability of use to a page that was stored in main memory relatively more recently.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
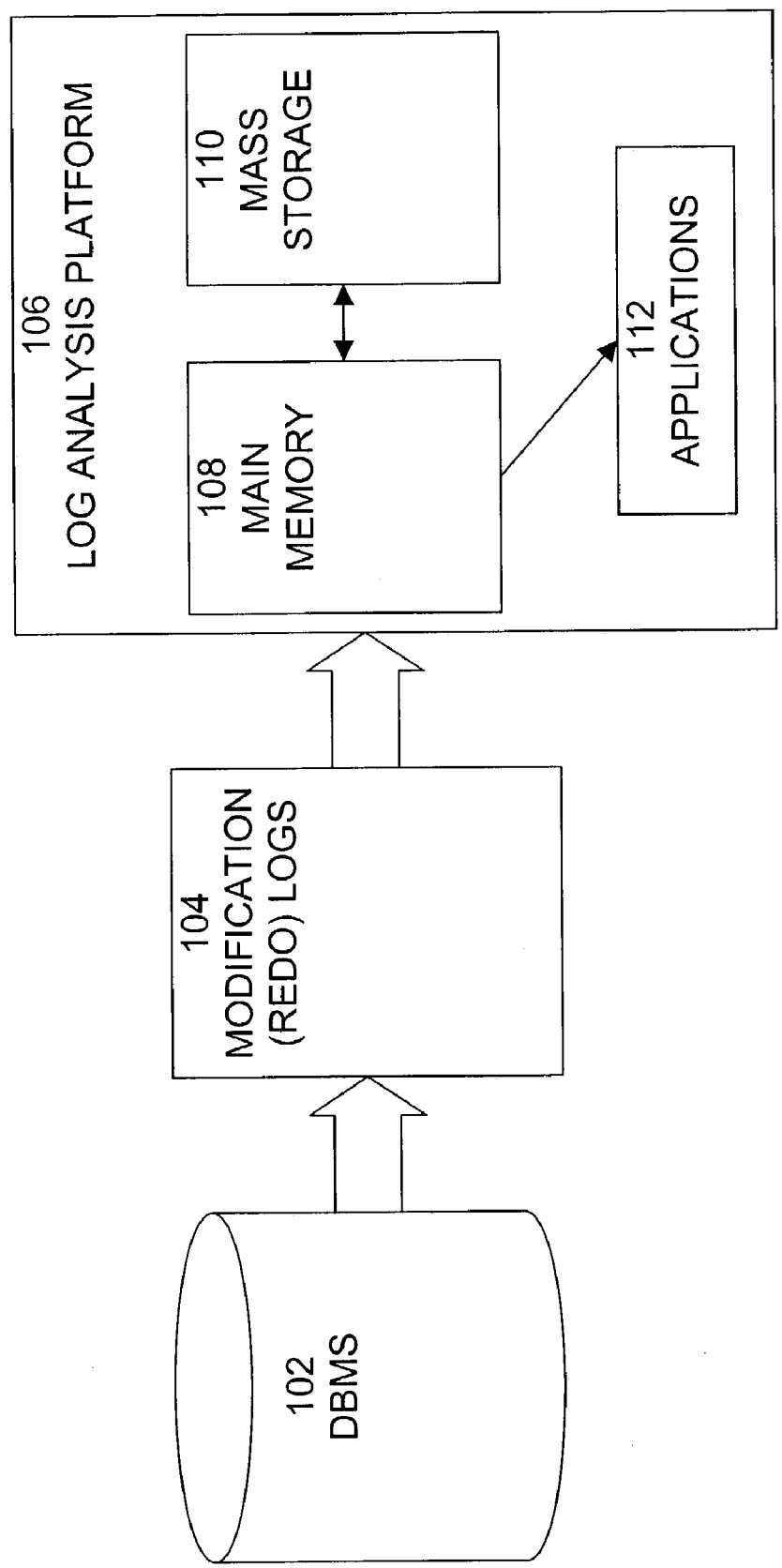
FIG. 1 is an exemplary block diagram of a system in which the present invention may be implemented.

An exemplary system 100 in which the present invention may be implemented is shown in FIG. 1. System 100 includes database management system (DBMS) 102, modification or redo logs 104, and log analysis platform 106. DBMS 102 provides the capability to store, organize, modify, and extract information from a database. From a technical standpoint, DBMSs can differ widely. The terms relational, network, flat, and hierarchical all refer to the way a DBMS organizes information internally. The internal organization can affect how quickly and flexibly you can extract information.

A database includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

A DBMS, such as DBMS 102, provides database management functions, which perform accesses to the database and store or retrieve data from the database. Such functions are often termed queries and are performed by using a database query language, such as structured query language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in posing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

Among the database management functions found in a typical DBMS 102 is the capability to log each modification or transaction that is performed on the database in a log, such as modification log 104. Modification logs 104 may be used to provide transaction durability. These logs are a source of information that can be used to support a variety of applications, such as:

Logical Standby—a duplicate copy of the database is maintained by replaying the logged transactions to generate a logical copy of the database.

Physical Standby—a bit-for-bit identical copy of the database is maintained by using block recovery of each block generated by the logged transactions.

Log-based Replication—changes to selected tables are mined out from the logged transactions and applied on a different DBMS to maintain replicas of these tables.

Change Data Capture—changes to selected tables are mined out and stored.

Log analysis platform 106 includes main memory 108, mass storage 110, and applications 112. Main memory 108 includes physical memory that is accessible by a processor to directly execute instructions and manipulate data stored in the main memory. Typically, main memory 108 is implemented as random-access memory (RAM). Data and instructions stored can be transferred between main memory 108 and mass storage 110. A processor can only execute instructions and manipulate data that is in main memory 108. For example, one or more applications 112 run by executing instructions stored in main memory 108 on the processor and by manipulating data that is stored in main memory 108.

A typical processor likely has too little main memory to store all the instructions and data needed to run the desired applications. Additional instructions and data may be stored in mass storage 110 and copied to main memory 108 when needed to run one or more applications 112. Mass storage 110 typically includes one or more hard disk drives, floppy disk drives, tape drives, or other devices. Instructions and data may be stored in mass storage 110, where they are available to be copied to main memory for execution and/or manipulation by the processor.

Applications 112 include software programs that perform analyses, such as statistical analysis and data mining, on the transaction data contained in modification logs 104. Preferably, a multi-process analysis infrastructure is provided that allows applications 112 access to the transaction data and hides the complexity of the transaction data formats while providing access through logical abstractions of transactions and data manipulation languages (DMLs). A DML is a set of statements used to store, retrieve, modify, and erase data from a database. There are two types of DML: procedural, in which the user specifies what data is needed and how to get it; and nonprocedural, in which the user specifies only what data is needed. The DML portion of the transaction data provides information about the manipulations that were performed on the data in the database.

The transactions are delivered to applications 112 in the order that they were performed in DBMS 102, although the applications may consume the transactions in an arbitrary order. Each delivered transaction consumes memory in main memory 108. Since the amount of main memory 108 in any system is limited, if an application demands more transactions without having consumed the previously delivered transactions, some transactions stored in main memory 108 will have to be paged out to mass storage 110 in order to make room for the demanded transactions.

In this environment, traditional paging schemes, such as LRU, do not provide optimum performance in paging blocks of transaction data between main memory and mass storage. The present invention provides an improved paging scheme, that provides improved performance in this and other applications. This improved paging scheme removes pages from main memory based on a computed parameter termed memory pressure. Memory pressure is defined as the product of an amount of time a page is or will be in memory without being used and the size of the memory page. At any given point at which a page must be removed from main memory, the page that has the largest memory pressure is removed first.

The size of a memory page can readily be determined. Time as measured on a computer system is an imprecise quantity, since it depends on factors such as system load. In order to determine an amount of time a page is or will be in memory without being used, it is preferable to define this time as a number of iterations of the application program that is consuming the page.

In order to determine which pages are exerting the largest memory pressure, those pages that are not likely to be used soon must be determined. This is accomplished by obtaining from each application the probability of use for each page in main memory. Each page includes data generated by processing modification or redo records from the redo logs and belongs to a transaction. A transaction can be of two types: transactions for which all data has been generated and transactions for which not all data has been generated. Those pages associated with transactions for which all data has been generated are more likely to be used soon by an application than those pages associated with transactions for which not all data has been generated. This is communicated by the application. Such pages are not paged out. Those pages associated with transactions for which not all data has been generated require further examination. There can be multiple pages of this type that are inter-related. If one or more inter-related pages in a group has been used, there is greater probability that the other pages of the inter-related group will be used. However, if none of the pages in an inter-related group has been used, there is less probability that any of the pages in the group will be used. Also, in this case, the probability of use of the pages in a group depends upon when each page was brought into memory. Those pages that have been in memory longer are more likely to be used sooner and those pages that have been brought into memory more recently are more likely to be used later.

The probability of use is used to determine an estimate of how soon each memory page will be used. In other words, a memory page having a low probability of used will likely not be used for a relatively long period of time, while a memory page having a high probability of use will likely be used in a relatively short period of time.

Thus, pages may be processed as follows:

Pages associated with transactions for which all data has been generated are not paged out.

Pages associated with transactions for which not all data has been generated are grouped by the transaction with which they are associated. Pages belonging to groups for which one or more pages have been accessed will not be paged out unless necessary. Pages belonging to groups for which no pages have been accessed are subject to being paged out. Such pages will be paged out based on the pages that were brought into memory more recently will be paged out first.

Figure 2:
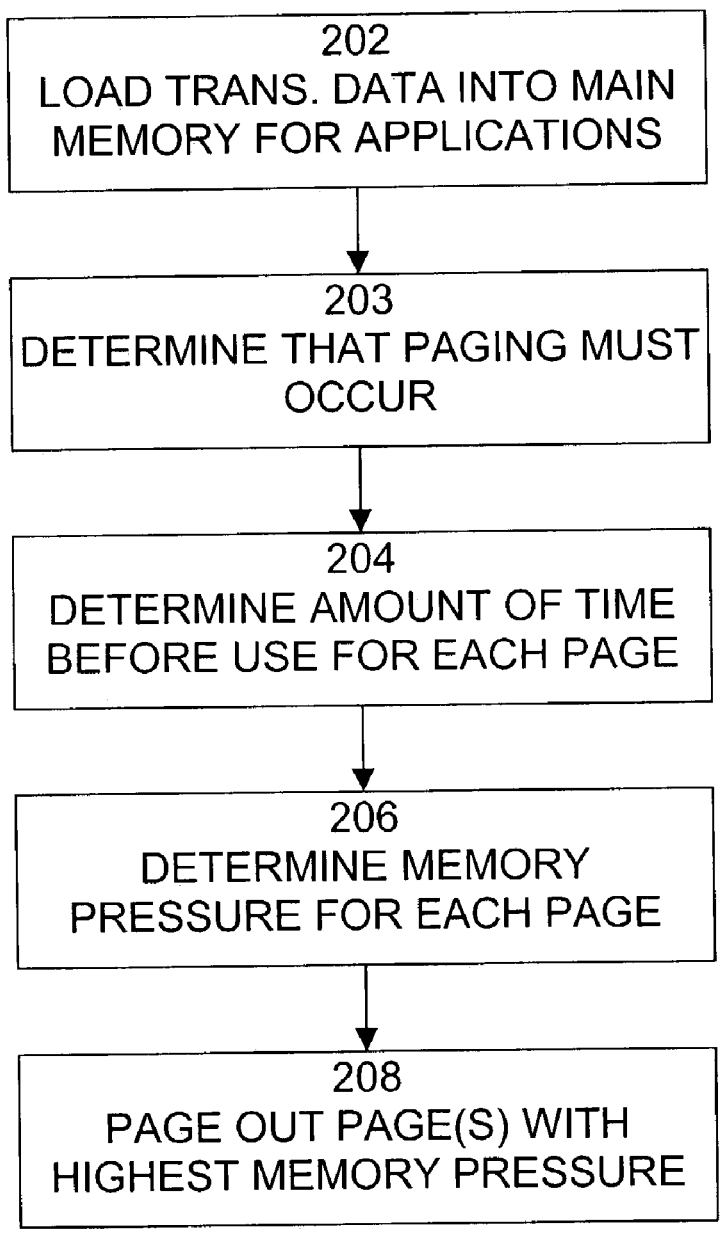
FIG. 2 is exemplary block diagram of a paging process based on memory pressure.
Figure 3:
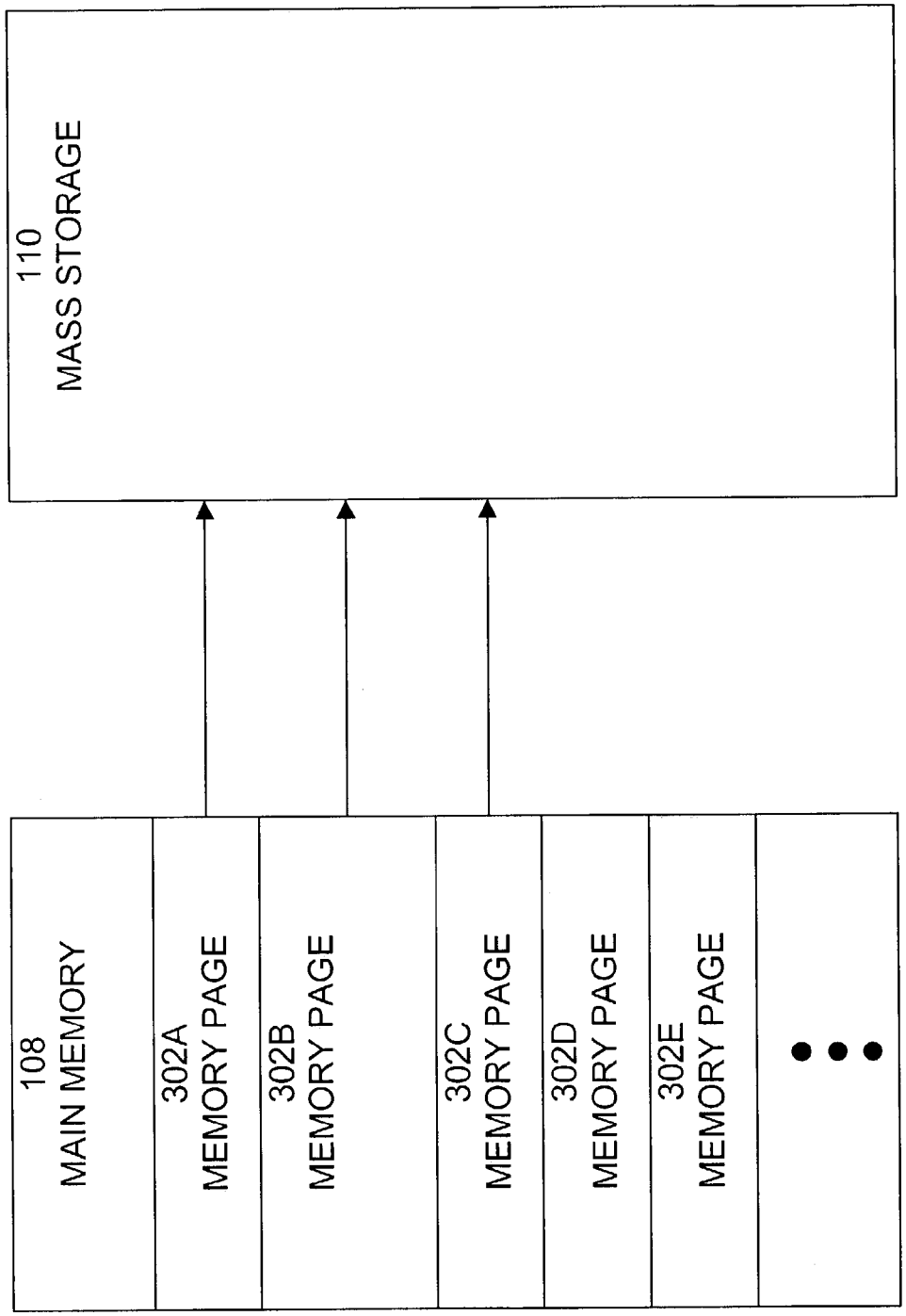
FIG. 3 is a data flow diagram of the operation of the paging process shown in FIG. 2.

An exemplary block diagram of a paging process 200 based on memory pressure is shown in FIG. 2. It is best viewed in conjunction with FIG. 3, which is a data flow diagram of the operation of paging process 200. Process 200 begins with step 202, in which pages or blocks of transaction data, such as memory pages 302A–302E, are loaded into main memory. Memory pages are associated with particular transactions, about which they include information, and may be grouped accordingly. For example, memory pages 302A and 302B may be associated with a first transaction and memory pages 302C–302E may be associated with a second transaction.

In step 203, it is determined that paging must occur. In particular, it is determined that one or more pages of transaction data is available to be loaded into main memory, but that there is insufficient room in main memory to load the transaction data.

In step 204, the amount of time before each memory page, such as pages 302A–302E, is or will be used. This is determined based on the probability of when each memory page will be used. The probability of use of each memory page is based on whether the page is associated with transactions for which all data has been generated and on whether any pages of a group of inter-related pages have been used. If a page is associated with a transaction for which all data has been generated, then there is a high probability that the page will be used. If the page is associated with a transaction for which not all data has been generated, then the probability that a page will be used depends on whether any pages of a group of inter-related pages have been used. The inter-related pages are grouped based on a transaction with which they are associated. An indication of whether any pages of each group of inter-related pages have been used is received from each application, since it is the applications that use the pages. If one or more inter-related pages in a group has been used, there is greater probability that the other pages of the inter-related group will be used. However, if none of the pages in an inter-related group has been used, there is less probability that any of the pages in the group will be used. Also, in this case, the probability of use of the pages in a group depends upon when each page was brought into memory. Those pages that have been in memory longer are more likely to be used sooner and those pages that have been brought into memory more recently are more likely to be used later.

In step 206, the memory pressure for each memory page is determined. Memory pressure is defined as the product of an amount of time a page is or will be in memory without being used and the size of the memory page. The probability of when a memory page may be used is used to estimate the amount of time a page is or will be in memory without being used. This estimate, multiplied by the size of the memory page, yields the memory pressure. For example, memory page 302B may be larger than other memory pages, such as memory page 302A, which may have a similar probability of use. In this case, memory page 302B will have a larger memory pressure than memory page 302A and memory page 302B will be paged out.

In step 208, the page or pages that have the highest memory pressure are paged out. At any given point at which a page must be removed from main memory, the page that has the largest memory pressure is removed first.

Figure 4:
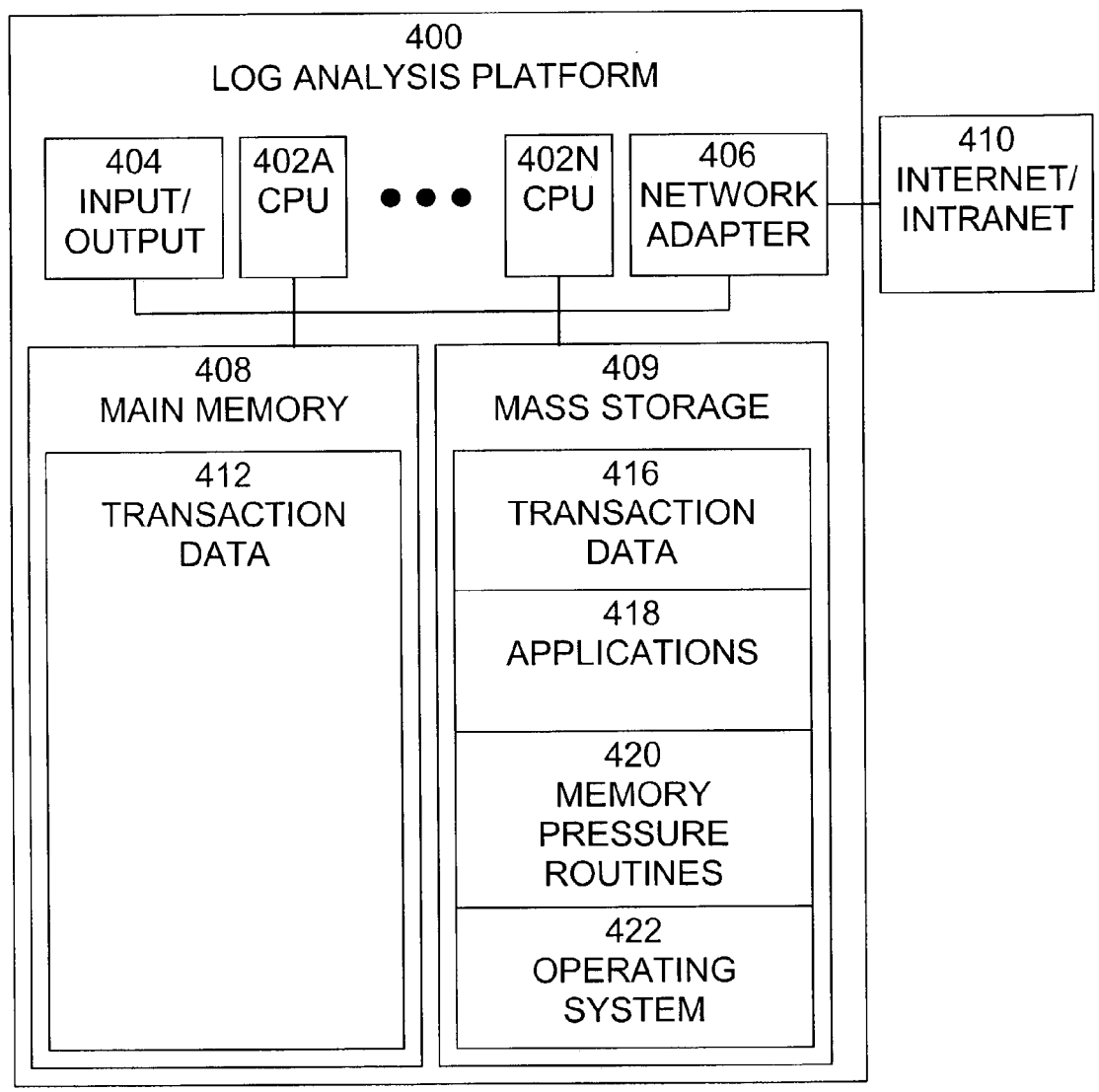
FIG. 4 is an exemplary block diagram of a system in which the present invention may be implemented.

An exemplary block diagram of a system in which the present invention may be implemented, such as log analysis platform 400 is shown in FIG. 4. Platform 400 is typically a programmed general-purpose computer system, such as a personal computer, workstation, server system, and minicomputer or mainframe computer. Platform 400 includes one or more processors (CPUs) 402A–302N, input/output circuitry 404, network adapter 406, and memory 408. CPUs 402A–302N execute program instructions in order to carry out the functions of the present invention. Typically, CPUs 402A–402N are one or more microprocessors, such as an INTEL PENTIUM® processor. FIG. 4 illustrates an embodiment in which platform 400 is implemented as a single multi-processor computer system, in which multiple processors 402A–402N share system resources, such as memory 408, input/output circuitry 404, and network adapter 406. However, the present invention also contemplates embodiments in which platform 400 is implemented as a plurality of networked computer systems, which may be single-processor computer systems, multi-processor computer systems, or a mix thereof.

Input/output circuitry 404 provides the capability to input data to, or output data from, platform 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces platform 400 with Internet/intranet 410. Internet/intranet 410 may include one or more standard local area network (LAN) or wide area network (WAN), such as Ethernet, Token Ring, the Internet, or a private or proprietary LAN/WAN.

Main memory 408 stores program instructions that are executed by, and data that are used and processed by, CPU 402 to perform the functions of platform 400. Memory 408 typically includes electronic memory devices, such as random-access memory (RAM), which are capable of high-speed read and write operations providing direct access by the CPUs 402A–N. Additional memory devices included in platform 400 may include read-only memory (ROM), programmable read-only memory (PROM), electrically erasable programmable read-only memory (EEPROM), flash memory, etc. Mass storage 409 may include electromechanical memory, such as magnetic disk drives, such as hard disk drives and floppy disk drives, tape drives, optical disk drives, etc., which may use one or more standard or special purpose interfaces.

Memory 408 includes transaction data 412 and applications 414. Transaction data 412 may include data generated from modification logs associated with a database. Mass storage 409 includes paged out transaction data 416, applications 418 memory pressure routines 420, paging routines 422, and operating system 424. Paged out transaction data 416 includes transaction data that has been paged out of main memory and stored in mass storage 409, according to the present invention. Applications 418 include software that uses transaction data 412 to perform various functions. Memory pressure routines 420 implement the memory pressure determination portions of process 200. Operating system 422 provides overall system functionality, including actually performing the paging as determined by memory pressure routines 420. Of course, in order to actually be executed by a CPU, portions of applications 418, memory pressure routines 420, and operating system 422 must be copied to main memory 408. For clarity, this is not shown in FIG. 4.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multitasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of paging data comprising the steps of:
   storing a plurality of pages of data in a main memory;
   determining that paging must occur; and
   paging out a page of data from the main memory based on the memory pressure of the page of data, which is based on a probability of use of each of the plurality of pages of data in the main memory, wherein the probability of use of each of the plurality of pages of data in the main memory is determined by:
   determining whether a page is associated with a transaction for which all data has been generated;
   if the page is associated with a transaction for which all data has been generated, assigning a higher probability of use; and
   if the page is associated with a transaction for which not all data has been generated, then:
   determining whether any pages in a group of pages associated with a transaction have been used,
   if at least one of page in the group of pages associated with a transaction have been used, assigning a higher probability of use, and
   if no page in the group of pages associated with a transaction have been used, assigning a lower probability of use.

2. The method of claim 1, wherein the paging out step comprises the steps of:
   determining an amount of time a page is or will be in memory for each of the plurality of pages of data in the main memory; and
   determining a memory pressure for each of the plurality of pages of data in the main memory.

3. The method of claim 1, wherein the step of determining a memory pressure for each of the plurality of pages of data in the main memory comprises the steps of:
   determining the memory pressure based on a product of the amount of time a page is or will be in memory without being used and a size of the page.

4. The method of claim 1, wherein the step of assigning a lower probability of use if no page in the group of pages associated with a transaction have been used comprises the step of:
   assigning a probability of use to a page based on how recently the page was stored in main memory.

5. The method of claim 4, wherein the step of assigning a probability of use to a page based on how recently the page was stored in main memory comprises the steps of:
   assigning a higher probability of use to a page that was stored in main memory relatively less recently; and
   assigning a lower higher probability of use to a page that was stored in main memory relatively more recently.

6. A system for paging data comprising:
   a processor operable to execute computer program instructions;
   a memory operable to store computer program instructions executable by the processor;
   a main memory operable to store a plurality of pages of data; and
   computer program instructions stored in the memory and executable to perform the steps of:
   storing a plurality of pages of data in the main memory;
   determining that paging must occur; and
   paging out a page of data from the main memory based on the memory pressure of the page of data, which is based on a probability of use of each of the plurality of pages of data in the main memory, wherein the probability of use of each of the plurality of pages of data in the main memory is determined by;
determining whether a page is associated with a transaction for which all data has been generated;
if the page is associated with a transaction for which all data has been generated, assigning a higher probability of use; and
if the page is associated with a transaction for which not all data has been generated, then:
determining whether any pages in a group of pages associated with a transaction have been used,
if at least one of page in the group of pages associated with a transaction have been used, assigning a higher probability of use, and
if no page in the group of pages associated with a transaction have been used, assigning a lower probability of use.

7. The system of claim 6, wherein the paging out step comprises the steps of:
determining an amount of time a page is or will be in memory for each of the plurality of pages of data in the main memory; and
determining a memory pressure for each of the plurality of pages of data in the main memory.

8. The system of claim 6, wherein the step of determining a memory pressure for each of the plurality of pages of data in the main memory comprises the steps of:
determining the memory pressure based on a product of the amount of time a page is or will be in memory without being used and a size of the page.

9. The system of claim 6, wherein the step of assigning a lower probability of use if no page in the group of pages associated with a transaction have been used comprises the step of:
assigning a probability of use to a page based on how recently the page was stored in main memory.

10. The system of claim 9, wherein the step of assigning a probability of use to a page based on how recently the page was stored in main memory comprises the steps of:
assigning a higher probability of use to a page that was stored in main memory relatively less recently; and
assigning a lower higher probability of use to a page that was stored in main memory relatively more recently.

11. The system of claim 6, wherein the memory and the main memory are the same memory.

12. The system of claim 6, wherein the memory and the main memory are different memories.

13. A computer program product for paging data, comprising:
a computer readable medium;
computer program instructions, recorded on the computer readable medium, executable by a processor, for performing the steps of
storing a plurality of pages of data in a main memory;
determining that paging must occur; and
paging out a page of data from the main memory based on the memory pressure of the page of data, which is based on a probability of use of each of the plurality of pages of data in the main memory, wherein the probability of use of each of the plurality of pages of data in the main memory is determined by:
determining whether a page is associated with a transaction for which all data has been generated;
if the page is associated with a transaction for which all data has been generated, assigning a higher probability of use; and
if the page is associated with a transaction for which not all data has been generated, then:
determining whether any pages in a group of pages associated with a transaction have been used,
if at least one of page in the group of pages associated with a transaction have been used, assigning a higher probability of use, and
if no page in the group of pages associated with a transaction have been used, assigning a lower probability of use.

14. The computer program product of claim 13, wherein the paging out step comprises the steps of:
determining an amount of time a page is or will be in memory for each of the plurality of pages of data in the main memory; and
determining a memory pressure for each of the plurality of pages of data in the main memory.

15. The computer program product of claim 13, wherein the step of determining a memory pressure for each of the plurality of pages of data in the main memory comprises the steps of:
determining the memory pressure based on a product of the amount of time a page is or will be in memory without being used and a size of the page.

16. The computer program product of claim 13, wherein the step of assigning a lower probability of use if no page in the group of pages associated with a transaction have been used comprises the step of:
assigning a probability of use to a page based on how recently the page was stored in main memory.

17. The computer program product of claim 16, wherein the step of assigning a probability of use to a page based on how recently the page was stored in main memory comprises the steps of:
assigning a higher probability of use to a page that was stored in main memory relatively less recently; and
assigning a lower higher probability of use to a page that was stored in main memory relatively more recently.

18. A method of paging data comprising the steps of:
storing a plurality of pages of data in a main memory;
determining that paging must occur; and
paging out a page of data from the main memory based on the memory pressure of the page of data;
wherein the paging out step comprises the steps of determining an amount of time a page is or will be in memory for each of the plurality of pages of data in the main memory, and determining a memory pressure for each of the plurality of pages of data in the main memory;
wherein the step of determining a memory pressure for each of the plurality of pages of data in the main memory comprises the step of determining the memory pressure based on a product of the amount of time a page is or will be in memory without being used and a size of the page;
wherein the step of determining an amount of time a page is or will be in memory for each of the plurality of pages of data in the main memory comprises the step of determining a probability of use of each of the plurality of pages of data in the main memory; and
wherein the step of determining a probability of use of each of the plurality of pages of data in the main memory comprises the steps of determining whether a page is associated with a transaction for which all data has been generated, if the page is associated with a transaction for which all data has been generated, assigning a higher probability of use, and if the page is associated with a transaction for which not all data has been generated, then determining whether any pages in a group of pages associated with a transaction have been used, if at least one of page in the group of pages associated with a transaction have been used, assigning a higher probability of use, and if at no page in the group of pages associated with a transaction have been used, assigning a lower probability of use.

19. The method of claim 18, wherein the step of assigning a lower probability of use if at no page in the group of pages associated with a transaction have been used comprises the step of:
assigning a probability of use to a page based on how recently the page was stored in main memory.

20. The method of claim 19, wherein the step of assigning a probability of use to a page based on how recently the page was stored in main memory comprises the steps of:
assigning a higher probability of use to a page that was stored in main memory relatively less recently; and
assigning a lower higher probability of use to a page that was stored in main memory relatively more recently.

21. A system for paging data comprising:
a processor operable to execute computer program instructions;
a memory operable to store computer program instructions executable by the processor;
a main memory operable to store a plurality of pages of data; and
computer program instructions stored in the memory and executable to perform the steps of:
storing a plurality of pages of data in the main memory;
determining that paging must occur; and
paging out a page of data from the main memory based on the memory pressure of the page of data;
wherein the paging out step comprises the steps of determining an amount of time a page is or will be in memory for each of the plurality of pages of data in the main memory, and determining a memory pressure for each of the plurality of pages of data in the main memory;
wherein the step of determining a memory pressure for each of the plurality of pages of data in the main memory comprises the step of determining the memory pressure based on a product of the amount of time a page is or will be in memory without being used and a size of the page;
wherein the step of determining an amount of time a page is or will be in memory for each of the plurality of pages of data in the main memory comprises the step of determining a probability of use of each of the plurality of pages of data in the main memory; and
wherein the step of determining a probability of use of each of the plurality of pages of data in the main memory comprises the steps of determining whether a page is associated with a transaction for which all data has been generated, if the page is associated with a transaction for which all data has been generated, assigning a higher probability of use, and if the page is associated with a transaction for which not all data has been generated, then determining whether any pages in a group of pages associated with a transaction have been used, if at least one of page in the group of pages associated with a transaction have been used, assigning a higher probability of use, and if at no page in the group of pages associated with a transaction have been used, assigning a lower probability of use.

22. The system of claim 21, wherein the step of assigning a lower probability of use if at no page in the group of pages associated with a transaction have been used comprises the step of:
assigning a probability of use to a page based on how recently the page was stored in main memory.

23. The system of claim 22, wherein the step of assigning a probability of use to a page based on how recently the page was stored in main memory comprises the steps of:
assigning a higher probability of use to a page that was stored in main memory relatively less recently; and
assigning a lower higher probability of use to a page that was stored in main memory relatively more recently.

24. A computer program product for paging data, comprising:
a computer readable medium;
computer program instructions, recorded on the computer readable medium, executable by a processor, for performing the steps of
storing a plurality of pages of data in a main memory;
determining that paging must occur; and
paging out a page of data from the main memory based on the memory pressure of the page of data;
wherein the paging out step comprises the steps of determining an amount of time a page is or will be in memory for each of the plurality of pages of data in the main memory, and determining a memory pressure for each of the plurality of pages of data in the main memory;
wherein the step of determining a memory pressure for each of the plurality of pages of data in the main memory comprises the step of determining the memory pressure based on a product of the amount of time a page is or will be in memory without being used and a size of the page;
wherein the step of determining an amount of time a page is or will be in memory for each of the plurality of pages of data in the main memory comprises the step of determining a probability of use of each of the plurality of pages of data in the main memory; and
wherein the step of determining a probability of use of each of the plurality of pages of data in the main memory comprises the steps of determining whether a page is associated with a transaction for which all data has been generated, if the page is associated with a transaction for which all data has been generated, assigning a higher probability of use, and if the page is associated with a transaction for which not all data has been generated, then determining whether least one of page in the group of pages associated with a transaction have been used, assigning a higher probability of use, and if at no page in the group of pages associated with a transaction have been used, assigning a lower probability of use.

25. The computer program product of claim 24, wherein the step of assigning a lower probability of use if at no page in the group of pages associated with a transaction have been used comprises the step of:
assigning a probability of use to a page based on how recently the page was stored in main memory.

26. The computer program product of claim 25, wherein the step of assigning a probability of use to a page based on how recently the page was stored in main memory comprises the steps of:
assigning a higher probability of use to a page that was stored in main memory relatively less recently; and
assigning a lower higher probability of use to a page that was stored in main memory relatively more recently.

* * * * *